(12) United States Patent
Jho et al.

(10) Patent No.: US 8,447,036 B2
(45) Date of Patent: May 21, 2013

(54) MULTI-PARTY KEY AGREEMENT METHOD USING BILINEAR MAP AND SYSTEM THEREFOR

(75) Inventors: Namsu Jho, Seoul (KR); Dowon Hong, Daejeon (KR); Myunghwan Kim, Seoul (KR); Byunggil Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1078 days.

(21) Appl. No.: 12/179,652

(22) Filed: Jul. 25, 2008

(65) Prior Publication Data

US 2009/0154711 A1    Jun. 18, 2009

(30) Foreign Application Priority Data

Dec. 18, 2007    (KR) .......................... 10-2007-0133562

(51) Int. Cl.
*H04L 9/00*    (2006.01)

(52) U.S. Cl.
USPC .................. 380/277; 713/171; 726/1; 726/2; 726/4; 726/13; 380/278; 380/279

(58) Field of Classification Search
USPC ....... 380/277, 278, 279; 713/157, 171; 726/1, 726/2, 4, 6, 9, 13
See application file for complete search history.

(56) References Cited

U.S. PATENT DOCUMENTS

| | | | | |
|---|---|---|---|---|
| 5,610,982 | A * | 3/1997 | Micali .......................... | 713/157 |
| 6,675,298 | B1 * | 1/2004 | Folmsbee ...................... | 713/190 |
| 7,590,236 | B1 * | 9/2009 | Boneh et al. ................... | 380/30 |
| 8,316,237 | B1 * | 11/2012 | Felsher et al. ................ | 713/171 |
| 2005/0005157 | A1 * | 1/2005 | Folmsbee ...................... | 713/200 |
| 2007/0186109 | A1 | 8/2007 | Nyberg et al. | |
| 2009/0225986 | A1 * | 9/2009 | Gennaro et al. .............. | 380/278 |
| 2010/0131755 | A1 * | 5/2010 | Zhu et al. ...................... | 713/155 |
| 2010/0185863 | A1 * | 7/2010 | Rabin et al. ................... | 713/171 |
| 2012/0159588 | A1 * | 6/2012 | Zhu et al. .......................... | 726/6 |
| 2012/0174207 | A1 * | 7/2012 | Zhu et al. .......................... | 726/9 |

FOREIGN PATENT DOCUMENTS

KR    1020060033424 A    4/2006

OTHER PUBLICATIONS

Colin Boyd, et al: "Round-optimal Contributory Conference Key Agreement", LNCS 2567, Pub. 2003, pp. 161-174.
Emmanuel Bresson, et al: "Constant Round Authenticated Group Key Agreement via Distributed Computation", LNCS 2947, Pub. 2004, pp. 115-129.
Nam-Su Jho; "Multiparty Key Agreement using Weil Pairing", A Dissertation Submitted to the Faculty of Graduate School Seoul National University, Aug. 1, 2007.
Nam-Su Jho, et al; "Multiparty Key Agreement Using Bilinear Map", http://eprint.iacr.org/, Nov. 26, 2007.
Rana Barua, et al; "Extending Joux's Protocol to Multi Party Key Agreement", Cryptology Research Group, Stat-Math and Applied Statistics Unit, India, pp. 1-18 no date given.

* cited by examiner

*Primary Examiner* — Thu Ha Nguyen
(74) *Attorney, Agent, or Firm* — Ladas & Parry LLP

(57) ABSTRACT

The present invention provides an efficient method and system in which a plurality of participants share a secret key in a communication environment that is not ensured. According to an embodiment of the invention, each of the participants is assigned with a secret key from a key generation party, generates exchange information, and transmits its own exchange information to the other participant to exchange the exchange information with each other. Each of the participants generates a shared key on the basis of the exchange information and its own secret key.

17 Claims, 2 Drawing Sheets

MULTI-PARTY KEY AGREEMENT METHOD USING BILINEAR MAP AND SYSTEM THEREFOR

BACKGROUND OF THE INVENTION

1. Field of the Invention

The present invention relates to a multi-party key agreement method and a system therefor, and more particularly, to a multi-party key agreement method that is capable of quickly and safely sharing a multi-party key using a bilinear map and a system therefor.

This work was supported by the IT R&D program of MIC/IITA [2005-Y-001-03, Developments of next generation security technology].

2. Description of the Related Art

It is necessary to share a secret key for an encryption algorithm in order to perform secret-ensured communication using a communication environment, such as a wireless communication environment or the Internet, which is not cryptologically ensured. As exemplary methods for implementing sharing the secret key, a key distribution method and a key agreement/exchange method are generally used. In the key distribution method, one participant selects a key and transmits the selected key to the other participants. In the key agreement/exchange method, all participants participate in a key generation process and generate a new key. According to the key distribution method, since there is a problem in that participants may select a specific key for the purpose of malevolent utilization, this method is not used in the case where participants who select a key are not trusted parties. The present invention relates to a cryptological key agreement method for a plurality of participants.

The cryptological key agreement method is first suggested by Diffie and Hellman in 1976.

According to a Diffie-Hellman (DH) key agreement method, a key can be efficiently shared. However, the Diffie-Hellman (DH) method is vulnerable to impersonations exemplified as man-in-the-middle attacks, that is, attacks to use an ID and password of a normal user by stealth and pretend to be that user.

In order to prevent the impersonations, a key agreement method including a participant authentication function has been suggested, which is called authenticated key agreement.

Participant authentication methods may be classified into two methods. A method in which participants are authenticated such that the other participants other than normal participants cannot know a shared key is called an implicit authenticated key agreement.

Further, a method in which all of keys generated by individual normal participants are ensured to be the same is called key confirmation. A method that satisfies both an implicit authenticated key agreement and key confirmation is called an explicit key agreement.

A key agreement method in which a plurality of participants can simultaneously share a key is called a multi-party key agreement method. A multi-party key agreement method to be safe and efficient is not developed yet. In the multi-party key agreement method, it is very important to minimize the traffic that is needed to share a key. This is referred to as communication complexity. In particular, it is important to develop an optimized multi-party key exchange method having communication complexity of one round.

In regards to the multi-party key exchange method, first, Ingemarsson, Tang, and Wong extend it to a multi-party key agreement method on basis of a DH key agreement in 1982. After that, various researches are made to satisfy various safety requirements. As an exemplary research result of an efficient multi-party key agreement method, a multi-party key agreement method that is suggested by Bresson and Catalano shows communication complexity of two round, and is recognized as a most excellent result in terms of safety and efficiency. In regards to the multi-party key agreement method that has communication complexity of one round, there is only a method that is suggested by Boyd and Nieto. However, this method has a problem in that important safety requirements, such as forward secrecy, are satisfied and individual participants do not equally contribute to a key agreement.

SUMMARY OF THE INVENTION

Accordingly, it is an object of the invention to minimize communication complexity that is required for a multi-party key agreement. The communication complexity is calculated from a procedure that participants performs to share a key on the basis of the number of times of transmission/reception steps. Since each step is performed after a previous step is completed, the larger the communication complexity is, the longer an actual step execution time is. The invention suggests a new multi-party key agreement method that has communication complexity of one round.

According to an aspect of the invention, a multi-party key agreement method includes allowing each of the participants to be assigned with a secret key from a key generation party; allowing each of the participants to generate exchange information; allowing each of the participants to transmit its own exchange information to the other participants, such that the exchange information is exchanged between the participants; and allowing each of the participants to generate a shared key on the basis of the received exchange information and its own secret key.

The exchange information may be generated on the basis of values that are generated from groups where bilinear maps are defined and are opened by the key generation party.

In the generating of the shared key, each of the participants may calculate a bilinear map of the received exchange information and its own secret key and generate the shared key.

The multi-party key agreement method according to the aspect of the invention may further include, after the exchanging of the exchange information, using the exchange information transmitted from the other participants to calculate a bilinear map and verifying the other participants.

According to another aspect of the invention, a multi-party key agreement system includes a key generation party and a plurality of participants. The key generation party assigns a secret key to each of the participants. Each of the participants generates exchange information and transmits the exchange information to the other participants, such that the exchange information is exchanged between the participants, and generates a shared key on the basis of the exchange information received from the other participants and its own secret key.

The exchange information may be generated on the basis of values that are generated from groups where bilinear maps are defined and are opened by the key generation party.

Each of the participants may calculate a bilinear map of the received exchange information and its own secret key and generate the shared key.

Each of the participants may use the exchange information transmitted from the other participants to calculate a bilinear map and verify the other participants.

According to a multi-party key agreement method and a system therefor of the invention, a plurality of participants can share a key such that they can perform ensured communication even in a communication environment that is not ensured. Therefore, each of the participants can perform secret-ensured communication in all environments.

According to the invention, since a step of only one round is needed to allow a plurality of participants to share a key, it is possible to efficiently share the key, as compared with the key exchange methods in the related art.

According to the invention, key confirmation can be made without additionally transmitting a message.

DESCRIPTION OF THE PREFERRED EMBODIMENTS

First, an environment to which the invention is applied will be described. It is assumed that participants use a communication environment, such as the Internet or a wireless communication environment, which is not ensured, to perform ensured secret communication with the other participants. In this case, if a cryptological secret key is shared by the participants, the participants can communicate with each other using a variety of known encryption algorithms. However, in a situation where there is no shared secret key, it is required to perform a process of securely sharing a secret key in a communication environment that is not ensured.

A multi-party key agreement method using a bilinear map that is suggested by the invention will be described with reference to FIGS. 1 to 3.

Figure 1:
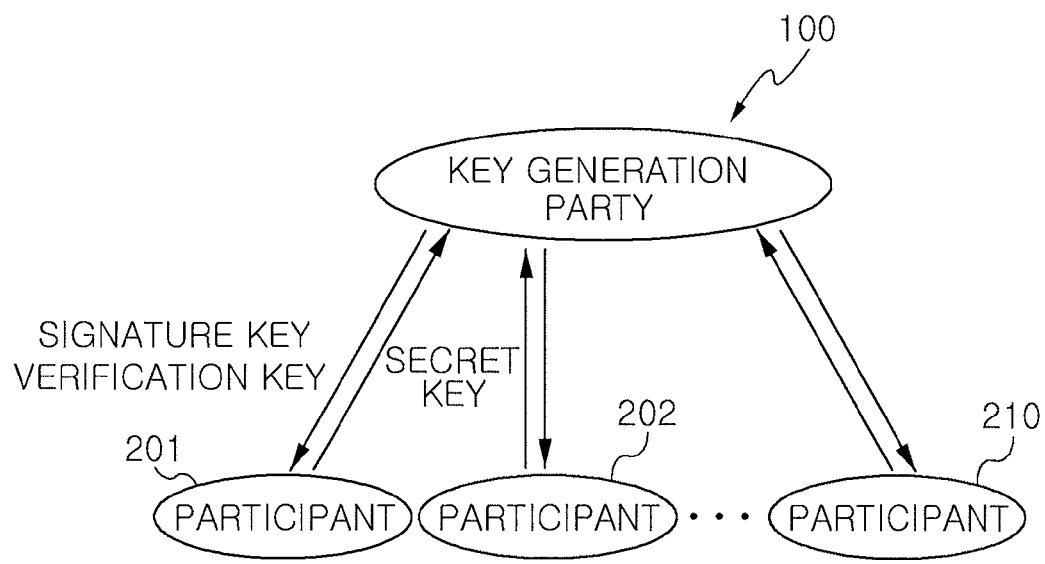
FIG. 1 is a structural view illustrating a relationship between participants and a key generation party that perform prior work in a key agreement method according to an embodiment of the invention.
Figure 2:
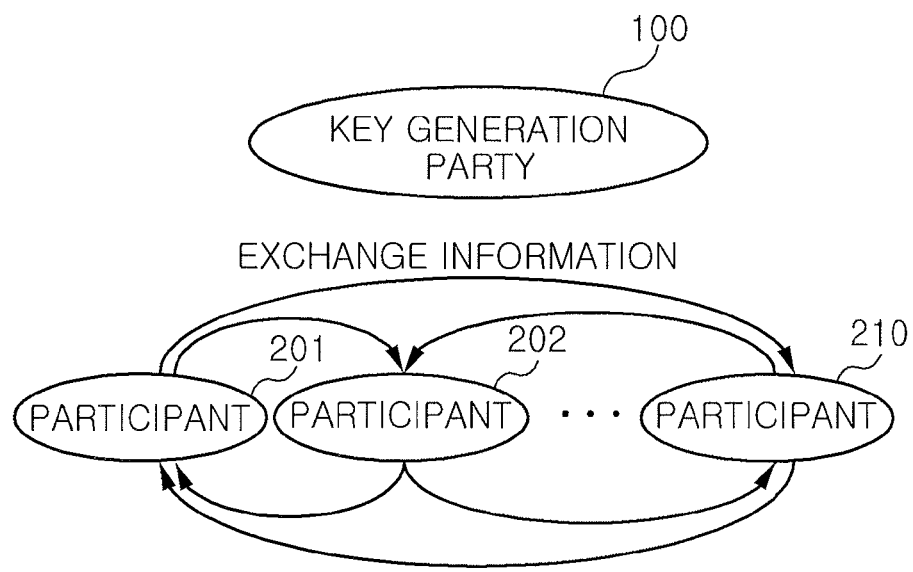
FIG. 2 is a structural view illustrating a relationship between participants that exchange information in a key agreement method according to an embodiment of the invention.
Figure 3:
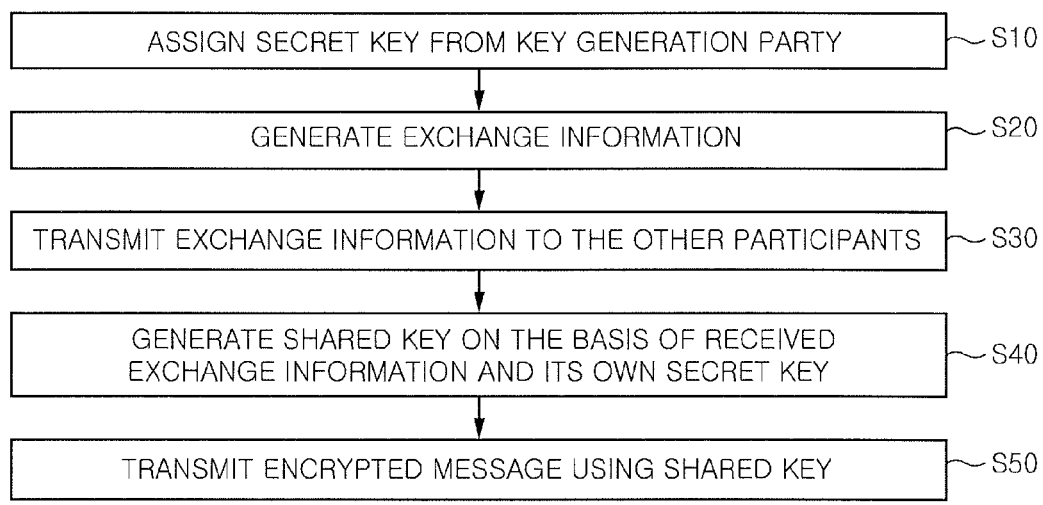
FIG. 3 is a flowchart illustrating a key agreement method according to an embodiment of the invention.

FIGS. 1 and 2 show a structure of a multi-party key agreement according to an embodiment of the invention.

A multi-party key agreement system according to an embodiment of the invention includes a key generation party 100 and a plurality of participants 201, 202, . . . , and 210.

A multi-party key agreement method mainly includes a step (see FIG. 1) in which a key generation party provides advance information to participants, and a step (see FIG. 2) in which the participants exchanges exchanging information with each other to generate a shared key. The participants 201, 202, . . . , and 210 communicate with the key generation party 100 as prior work before transmitting the exchange information. In actual, a process of actually sharing a key is completed by one round of a step of transmitting and receiving exchange information between the participants. In this process, since the participants do not communicate with the key generation party 100, it is possible to prevent communication from being concentrated on the key generation party 100.

The key agreement method according to each step will be described in detail with reference to FIG. 3.

First, the key generation party 100 to be reliable performs prior calculation work and generates open information in order to allocate a secret key to each of the participants. The key generation party selects a cryptographically secure bilinear map, that is, e: $G_1 \times G_1 \rightarrow G_2$, and groups $G_1$ and $G_2$ in which the bilinear map is defined. Here, $G_1$ is assumed as an additive group. Exemplary examples of the cryptographically secure bilinear map are Weil pairing and Tate pairing. Then, the key generation party arbitrarily selects a constructor P of $G_1$ and integers a and s, and determines the maximum number t of participants to which keys are allocated. The key generation party opens e, G1, G2, t, P, aP, $a^2P$, . . . , and $a^tP$.

Then, the key generation party 100 assigns a secret key required for a key exchange process to each of the participants 201, 202, . . . , and 210. The process is as follows.

First, it is assumed that each of the participants 201, 202, . . . , and 210 has a pair of keys S and V that correspond to its own signature key and verification key required for an electronic signature. The i-th participant $u_i$ confirms its own status to the key generation party and transmits its own verification key $V_i$ to the key generation party 100. The key generation party assigns an exclusive discriminator Ii composed of an integer in a range of 1 to t to each of the participants 201, 202, . . . , and 210, and calculates $sa^{I_i}P$ on the basis of the assigned discriminators. $sa^{I_i}P$ becomes a unique secret key of the participant who has the discriminator $I_i$. After the secret key is transmitted to each of the participants, the key generation party opens $I_i$ and $V_i$ of the participants.

Then, among the participants 201, 202, . . . , and 210 that are assigned with the secret keys from the key generation party 100, participants who desire to exchange keys are gathered and exchange keys with each other (Step S20).

In this step, the key generation party performs only a function of maintaining open information, and does not participate in an actual key exchange process. Since each of the participants can obtain open information required for key exchange in advance, it is possible to prevent that the communication is concentrated on the key generation party in the key exchange process.

For better understanding of description, it is assumed that the participants having discriminators $I_1, I_2, \ldots,$ and $I_n$ desire to exchange keys (where $n \leq t$). Each of the participants $I_i$ selects an arbitrary number $R_i$ and performs calculation with respect to each $I_j$ ($j \neq i$) as follows: $R_i \times a^{t+1-I_j}P$ (where $a^{t+1-I_j}P$ indicates a value opened by the key generation party).

Each of the participants adds its own signature to (n−1) values calculated by each of the participants and transmits them to the other participants (Step S30). After receiving messages transmitted from the other participants, each of the participants verifies a signature of each participant, and confirms whether a corresponding message is a message transmitted from a normal participant. In the verification process, a verification key that is opened by the key generation party is used. After verifying the signature, each of the participants performs the following calculation:

$\Sigma a^{t+1-I_j}R_jP$ is calculated with respect to each j ($j \neq i$). Since $a^{t+1-I_i}R_iP$ can be automatically calculated, $\Sigma a^{t+1-I_j}R_jP$ is calculated with respect to all j. Finally, $e(\Sigma a^{t+1-I_j}R_jP, sa^{I_i}P) = e(P, P)^{a^{t+1}\Sigma R_j}$ is calculated (Step S40).

Each of the participants can use the shared key calculated in the above-described method to securely encrypt a message and transmit the message to the other participants (Step S50). Through information exchange of one round, all participants can securely have the shared key.

Further, confirming whether the messages transmitted by the participants have a type of $a^{t+1-I_j}R_jP$ with respect to all j is sufficient to confirm the keys. This can be easily confirmed by using two messages transmitted by two different participants to calculate bilinear maps and comparing the calculation results with each other. In this case, (n−2) bilinear maps need to be additionally calculated and an addition operation is additionally required by $(n-2)^2$ in $G_1$.

As described above, the participants can securely share keys even in a communication environment that is not ensured.

Although the multi-party key agreement method according to the invention has been described in connection with the above-described exemplary embodiment, various changes and modifications can be made without departing from the spirit and scope of the invention.

What is claimed is:

1. A multi-party key agreement method in which a plurality of participants share a key for encrypting messages communicated among the plurality of participants, the method comprising:
   allowing each of the participants to be assigned with a secret key from a key generation party;
   allowing each of the participants to generate exchange information;
   allowing each of the participants to transmit its own exchange information to the other participants, such that the exchange information is exchanged between the participants; and
   allowing each of the participants to generate a single shared key on the basis of the received exchange information and its own secret key, wherein the participants encrypt messages for transmission among the participants using the single shared key.

2. The multi-party key agreement method of claim 1, wherein the exchange information is generated on the basis of values that are generated from groups where bilinear maps are defined and that are opened by the key generation party.

3. The multi-party key agreement method of claim 2, wherein, in the generating of the single shared key, each of the participants calculates a bilinear map of the received exchange information and its own secret key and generates the single shared key.

4. The multi-party key agreement method of claim 1, further comprising:
   after the exchanging of the exchange information,
   verifying the other participants by calculating a bilinear map, using the exchange information transmitted from the other participants.

5. The multi-party key agreement method of claim 1, wherein the secret key is generated on the basis of values that are generated from groups where bilinear maps are defined and that are opened by the key generation party.

6. The multi-party key agreement method of claim 5, wherein the secret key is generated further on the basis of an identifier of each participant, each identifier being opened to other participants.

7. The multi-party key agreement method of claim 1, wherein the key generation party does not participate in key agreement processes after assigning the secret key.

8. The multi-party key agreement method of claim 7, wherein the key agreement processes are completed in one round.

9. A multi-party key agreement system, comprising:
a key generation party that generates a plurality of secret keys; and
a plurality of participants wherein each of the participants:
   receives a respective secret key of the plurality of secret keys generated by the key generation party,
   generates exchange information and transmits the exchange information to the other participants, such that the exchange information is exchanged between the participants, and
   generates a single shared key on the basis of the exchange information received from the other participants and its own respective secret key received from the key generation party, wherein the participants encrypt messages for transmission among the participants using the single shared key.

10. The multi-party key agreement system of claim 9, wherein the exchange information is generated on the basis of values that are generated from groups where bilinear maps are defined and that are opened by the key generation party.

11. The multi-party key agreement system of claim 10, wherein each of the participants calculates a bilinear map of the received exchange information and its own secret key and generates the single shared key.

12. The multi-party key agreement system of claim 9, wherein each of the participants uses the exchange information transmitted from the other participants to calculate a bilinear map and verifies the other participants.

13. The multi-party key agreement system of claim 9, wherein the key generation party generates each of the plurality of secret keys on the basis of values that are generated from groups where bilinear maps are defined and that are opened by the key generation party.

14. The multi-party key agreement system of claim 13, wherein the key generation party generates each of the plurality of secret keys further on the basis of an identifier of each participant, each identifier being opened to other participants.

15. The multi-party key agreement system of claim 9, wherein the key generation party does not participate in key agreement processes after assigning the secret key.

16. The multi-party key agreement system of claim 15, wherein the key agreement processes are completed in one round.

17. An apparatus comprising:
a key generation party that generates a plurality of secret keys; and
   a plurality of participants wherein each of the participants:
      receives a respective secret key of the plurality of secret keys generated by the key generation party, and
generates a single shared key on the basis of the respective secret key received from the key generation party, wherein the participants encrypt messages for transmission among the participants using the single shared key, and wherein the respective single shared keys are generated by each of the plurality of participants through communicating with each of the other of the plurality of participants no more than one time.

* * * * *